United States Patent
Takaishi et al.

(10) Patent No.: US 6,646,824 B1
(45) Date of Patent: Nov. 11, 2003

(54) HEAD-POSITIONING CONTROL METHOD AND DEVICE FOR A DISK DEVICE

(75) Inventors: Kazuhiko Takaishi, Kawasaki (JP); Shunji Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 09/685,111

(22) Filed: Oct. 10, 2000

(30) Foreign Application Priority Data

Dec. 22, 1999 (JP) .......................................... 11-364092

(51) Int. Cl.[7] .............................................. G11B 5/596
(52) U.S. Cl. .................................................... 360/77.02
(58) Field of Search ............................ 360/77.01, 77.02, 360/77.04, 78.01, 78.14

(56) References Cited

U.S. PATENT DOCUMENTS

| | | | |
|---|---|---|---|
| 5,136,561 A | * | 8/1992 | Goker .......................... 369/32 |
| 6,215,608 B1 | * | 4/2001 | Serrano et al. ................. 360/60 |

FOREIGN PATENT DOCUMENTS

| | | |
|---|---|---|
| JP | 8124136 | 5/1996 |
| JP | 8195044 | 7/1996 |
| JP | 8249844 | 9/1996 |
| JP | 10222942 | 8/1998 |
| JP | 11273285 | 10/1999 |

* cited by examiner

*Primary Examiner*—David Hudspeth
*Assistant Examiner*—Mitchell Slavitt
(74) *Attorney, Agent, or Firm*—Greer, Burns & Crain, Ltd.

(57) ABSTRACT

This invention relates to a head-positioning method and device for positioning the head, that reads a disk medium, to a specified position. A disk device having a head, actuator and control circuit comprises: a demodulation unit for demodulating the demodulated position from the head output, a calculation unit for calculating the error between the demodulated position and target position, and a gain-correction unit for correcting the error with a gain. Since a relative position is used, it is possible to accurately detect the position error, for which the non-linear characteristics of the head sensitivity distribution have been corrected, at each offset position.

12 Claims, 22 Drawing Sheets

FIG. 21
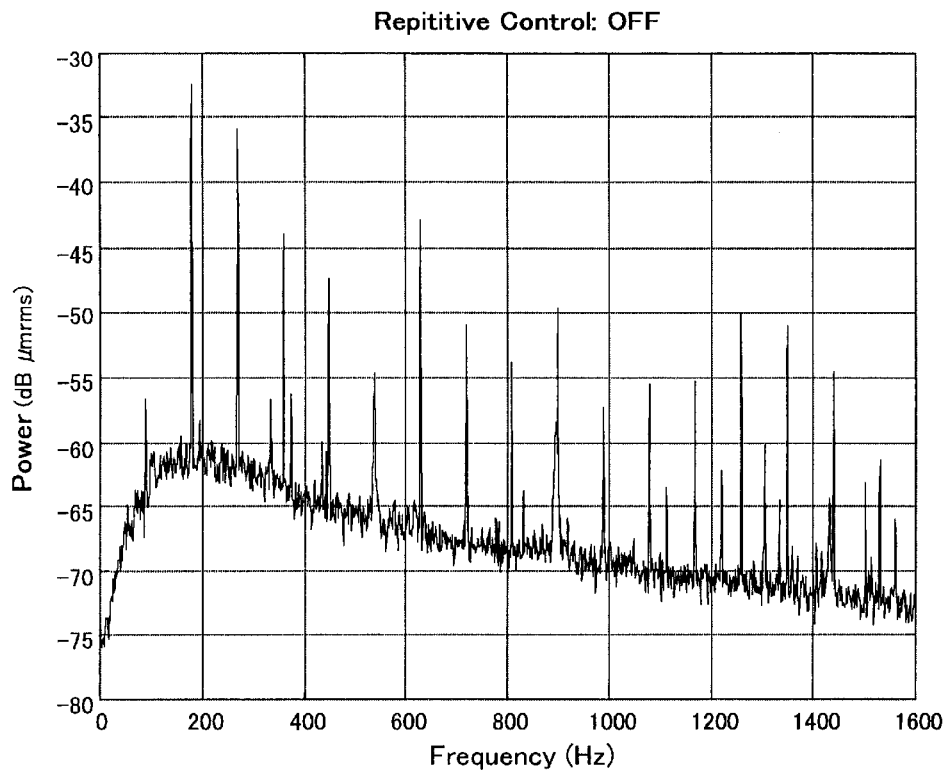
FIG. 22    Prior Art (Part 1)
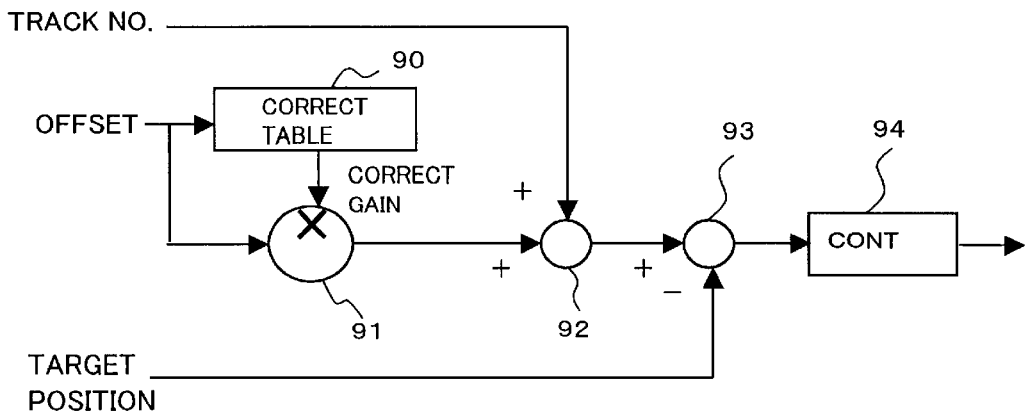

Prior Art (Part 2)

Prior Art

HEAD-POSITIONING CONTROL METHOD AND DEVICE FOR A DISK DEVICE

BACKGROUND OF THE INVENTION

1. Field of the Invention

This invention relates to a positioning control method and device for positioning the head of the disk device at a target position, and more particularly to a positioning control method and device for compensating for non-linear detection characteristics of the head.

2. Description of the related Art

Disk devices that read a disk medium with a head are widely used. For example, magnetic disk drives that are used as a storage device for a computer comprise a magnetic disk, a spindle motor for rotating the magnetic disk, a magnetic head for reading from and writing to the magnetic disk, and a VCM actuator for positioning the magnetic heat at a track on the magnetic disk. The recording density of this kind of disk drive is rapidly increasing, as well as is the track density of the magnetic disk. Particularly, by using an MR head for the magnetic head, high density storage have become possible. Therefore, high-precision positioning at high speed is becoming necessary.

When the disk drive receives a read or write command from the computer, it moves the magnetic head from the current position to the target position. This is called the seek operation. This seek operation is a transition operation which moves to following control after coarse control.

Feedback control is used for moving to the target position and for following at the target position. Feedback control detects the current position of the head, calculates the position error between the target position and the current position, and controls the actuator for the head in order to do away with the position error.

In order to detect the current position of the head, position information is recorded on the disk. The head reads the position information from the disk and detects the current position from the position information that is read. In addition, it calculates the position error between the target position and the current position. In the disk device, the current position is demodulated from a position signal that is read by the head, so the detection characteristics of the head affect the accuracy of detecting the current position. Therefore, it is necessary to compensate for the detection characteristics.

FIG. 22 is a schematic drawing of the feedback control system of the prior art. The position information (servo information) of the magnetic disk comprises a track number and a servo (burst servo) signal. The servo signal, for example, is a 4-phase servo signal that is 90-degrees out of phase. The position information that is read by the head is demodulated by a demodulation circuit, to obtain the track number and offset signal. The offset signal is obtained from the amplitude of the servo signal, and its magnitude is proportional to the amount that it has shifted from the center of the track for that track number.

The output level of the magnitude of this offset signal changes according to the characteristics of the magnetic head and the track position. Therefore, it is necessary to correct this change, and to convert the value of the offset signal to a value in actual track units. A method for doing this is known (for example, as disclosed in Japanese Unexamined published Patent No. H8-195044) where gains for the magnetic head and each track position (called the position sensitivity) are set, and the offset value is corrected by referencing the gain that corresponds to the head and track position.

In this method, it is assumed that the detection sensitivity of the head is uniform within the width of the track. However, as the track width becomes narrow, it is not possible to assume that the detection sensitivity of the head is uniform within the same track, due to the core width of the head. Especially, there is a strong tendency for this in the case of a MR head or GMR head. Therefore, it is not possible to accurately convert the demodulated offset value to the offset value of the track position. This error causes fluctuation in the loop gain of the feedback control system, and reduces the positioning accuracy.

A first method for correcting the non-linear characteristics of the head has been proposed (for example, as disclosed in Japanese Unexamined published Patent No. H10-222942). In other words, as shown in FIG. 22, there is a correction table 90 for storing the conversion gains (called position sensitivity) for the head, and each track position and offset position. The correction table 90 is referenced according to the demodulated offset value, in order obtain the corresponding correction gain. For example, as shown in FIG. 24, the correction table 90 stores correction gains (for example, for each 0.05 track) for each offset position indicated by a real position (Real Position).

A multiplier 91 multiplies the demodulated offset value by the correction gain to obtain a decoded offset position. As shown by the dotted line in FIG. 25, when this gain is a suitable gain, the decoded offset position indicates the real offset position. Furthermore, by adding this offset position and the track number with an adder 92, the current position is obtained. In addition, a computing element 93 subtracts the target position from the current position to calculate the position error. The position error is input to a servo-control unit 94. As mentioned above, the servo-control unit 94, performs coerce control, integral control or following control, depending on the value of the position error, and outputs the control amount. The head actuator (not shown in the figure) is driven according to this control amount, to position the head at the target position (target track).

On the other hand, another non-linear correction method, as shown in FIG. 23, is known (for example, Japanese Unexamined published patent H8-249844). In FIG. 24, the loop gain 97 of the controller 94 can be changed. Also, the gain of a demodulation circuit (position detection circuit) 96 for the each offset position from the track center is measured by a measurement circuit 98, and stored in memory. The gain 97 of the controller 94 is controlled by referencing the gain of the measurement circuit 98 according to the demodulated current position.

In this method, the position error is not corrected, however, by controlling the gain of the controller 94, the fluctuation of the loop gain of the control system due to the non-linearity of the head output is suppressed, and stable positioning is performed even at the offset position.

However, the prior art had the following problems.

(1) In the first non-linear correction method, it is difficult to obtain an accurate correction gain (correction curve) from the correction table 90. In other words, it is necessary to find the correction gain with the absolute position as a reference. Therefore, the correction gain for the absolute position is measured by the STW (servo track writer). However, the value measured by the STW is not necessarily the optimum value for each drive (device). In other words, the detection sensitivity changes due to the solid difference or setting of the demodulation circuit. Therefore, the relationship between the decoded position and the real position shifts, as shown by the solid line in FIG. 26, even though the gain measured by the STW is used, and this makes it impossible to correct to the accurate offset position for each individual drive.

(2) Also, the detection sensitivity of the head changes due to wear of the core end of the head or changes in characteristics of the MR element, and there is no guarantee that the detection sensitivity of the head will not be permanently changed. For this reason as well, there is the problem that it is not possible to correct to the accurate offset position for each individual drive. To solve this problem, it is necessary to measure the correction gain for the drive itself, however, since the drive controls positioning by using the position distorted by the effect of the head sensitivity distribution, it is difficult to find the accurate absolute position by using the distorted position, and there is the problem that the drive cannot measure the correction curve for the absolute position.

(3) In the second non-linear correction method, non-linear correction is performed by controlling the loop gain, so the control system is not affected by the non-linear characteristics, and it is possible to prevent a drop in the positioning accuracy. However, it is not possible to obtain accurate position error. Therefore, when allowing read/write from the position error, it is not possible to obtain accurate read/write timing. For example, there is about 20% error. Therefore, the start of reading or writing is slow, and the time it takes to start reading or writing after receiving a command becomes long and there is a drop in performance.

(4) Moreover, in the second non-linear correction method, since accurate position error cannot be found, the control system that is suitable for the controller 94 is limited to a lead-lag filter or PID control filter. For example, there is a problem in that an observer control system that requires accurate position error, is not suitable for the controller 94.

SUMMARY OF THE INVENTION

The objective of this invention is to provide a head-positioning control method and device for correcting the non-linear characteristics of the head and detecting accurate position error.

Another objective of this invention is to provide a head-positioning control method and device for detecting accurate position error even when using correction gain that is measured by the device itself.

A further objective of this invention is to provide a head-positioning control method and device for accurately detecting the starting point for reading or reading and writing.

Yet a further objective of this invention is to provide a head-positioning control method and device for which the control system of the controller is not limited even when correcting the non-linear characteristics of the head.

In order to accomplish the objectives of this invention, one form of the head-positioning control method for a disk device of this invention comprises: a step of demodulating a position information on a disk that is read by a head; a step of calculating a position error between the demodulated position and the target position; a step of correcting the position error using a set position gain according to an offset from a center of the track of the target position; a step of calculating the amount of control for the actuator that drives the head according to said corrected position error. Furthermore, said method includes a step of generating permission for the head to read or write, according to said corrected position error.

Moreover, one form of the head-positioning control device for a disk device of this invention comprises; a demodulation circuit for demodulating the position information on the aforementioned disk that is read by the head; and a control circuit for calculating the amount of control for the aforementioned actuator according to the position error between the aforementioned demodulated position and the target position; wherein the control circuit corrects the position error by a set position gain according to the offset from the center of the track of the target position, then calculates the amount control for the actuator that drives the aforementioned head according to the corrected position error. Furthermore, the control circuit generates permission for the head to read or write according to the corrected position error.

In this form of the invention, first, correction is performed using the distorted position without using the absolute position. Therefore, it is necessary to separate the offset and the position gain. In other words, in the prior first non-linear correction method, the absolute position from the STW is used as a reference and the it is necessary for the system to find the offset value (absolute value) from that, therefore it is not possible to separate the offset and the gain. However, in this invention, a gain is used for the position error between the demodulated offset value and the target value. In other words, gains are set for the target position and for a relative offset value. In this way, the absolute position does not need to be used, and since it is performed according to the relative position, it is possible to accurately obtain the position error even when using the distorted position.

Second, in the prior second non-linear correction method, the offset and gain are separated, however, since the loop gain is corrected, it is not possible to obtain the correct position error. In this invention, it is possible to obtain the correct position error, so it is possible to accurately detect the start of reading or writing. Moreover, it is possible to a control system, such as observer control, as the control system for the controller.

In the head-positioning control method of another form of the invention, wherein the correction step comprises: a step of using the aforementioned position error as the correction position error during seek control, and a step of correcting the aforementioned position error by the aforementioned position gain during following control.

In this form of the invention, correction is performed with the position gain during following, and gain correction is not performed during seeking. When a position gain is set for each offset position, since the head is continuously moving during seek control, the position gain that is referenced by the target position does not indicate the proper gain during operation. Therefore, seek control is not performed smoothly with position gain. To prevent this, correction by the position gain is prohibited during seeking.

In the head-positioning control method of another form of the invention, the aforementioned demodulation step comprises a step of correcting the offset signal of the aforementioned position information by the sensitivity gain that is set for the track number in the position information.

In this form of the invention, the continuity of the offset position is obtained from the phase-servo signal during demodulation, so correction is performed with the sensitivity gain.

The head-positioning control method of yet another form of the invention, further comprises a step of adding a sine wave to change the aforementioned offset position, and measure the values for the position gains at each offset position.

In the head-positioning control device of another form of the invention, the aforementioned control circuit adds a sine wave to change the aforementioned offset position, and measures the values for the position gains at each offset position.

In this form of the invention, first, the position gains for the device itself are measured. Therefore, it is possible to obtain the position gains that correspond to the characteristics of the device and head. Second, since measurement is performed by adding an external disturbance or sine wave, it is possible for the device to easily measure the position gain (slope).

BRIEF DESCRIPTION OF THE DRAWINGS

FIG. 21 is a drawing explaining the position error when the repetitive control of this invention is not used.

FIG. 22 is a drawing (1/2) explaining the prior art.

DESCRIPTION OF THE PREFERRED EMBODIMENTS

The embodiment of the invention will be explained below in the order: disk device, position-control system, gain-measurement process, an example, and other embodiments.

Disk Device

Figure 1:
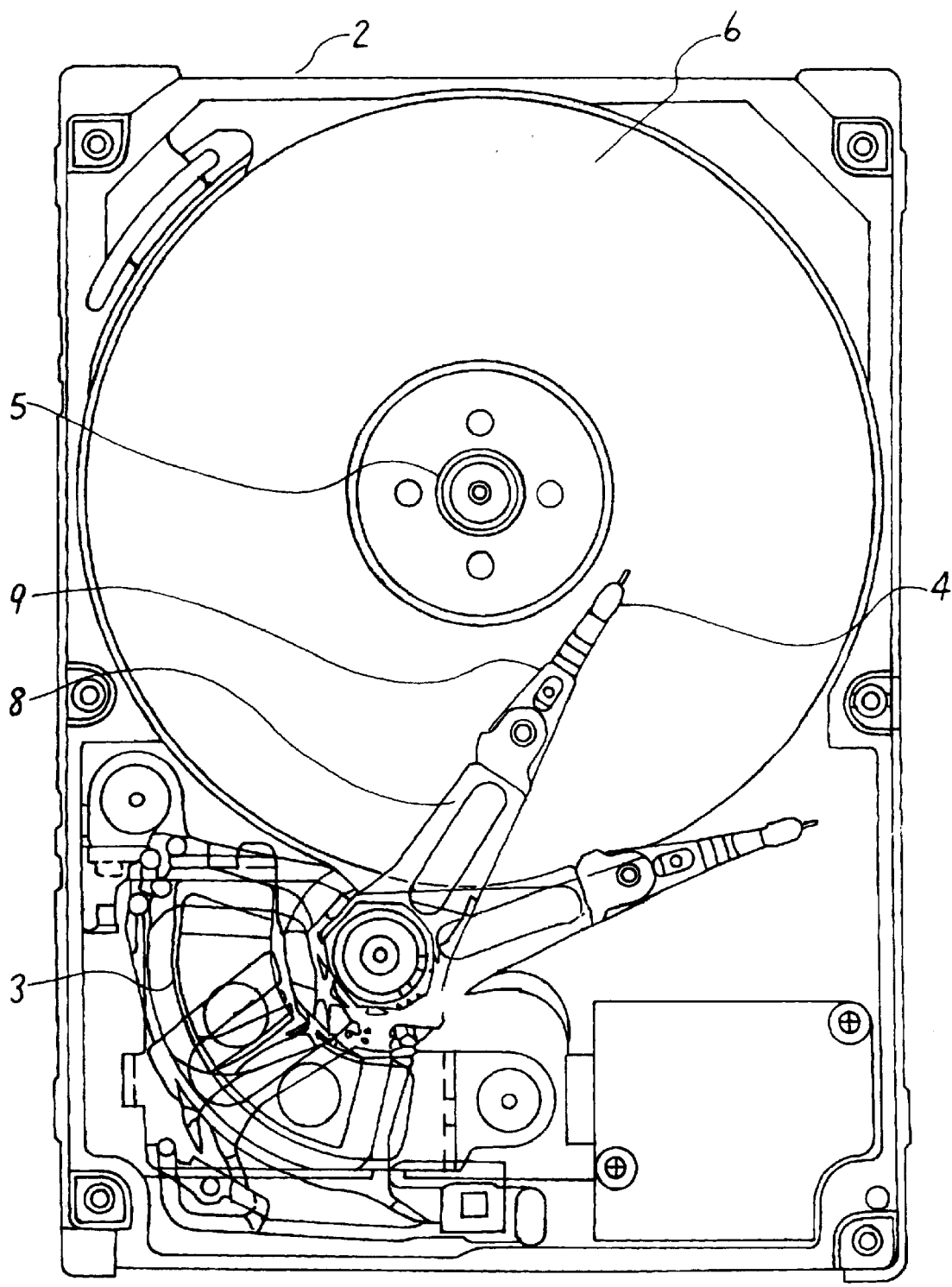
FIG. 1 is a top view of the disk device of an embodiment of the invention.
Figure 2:
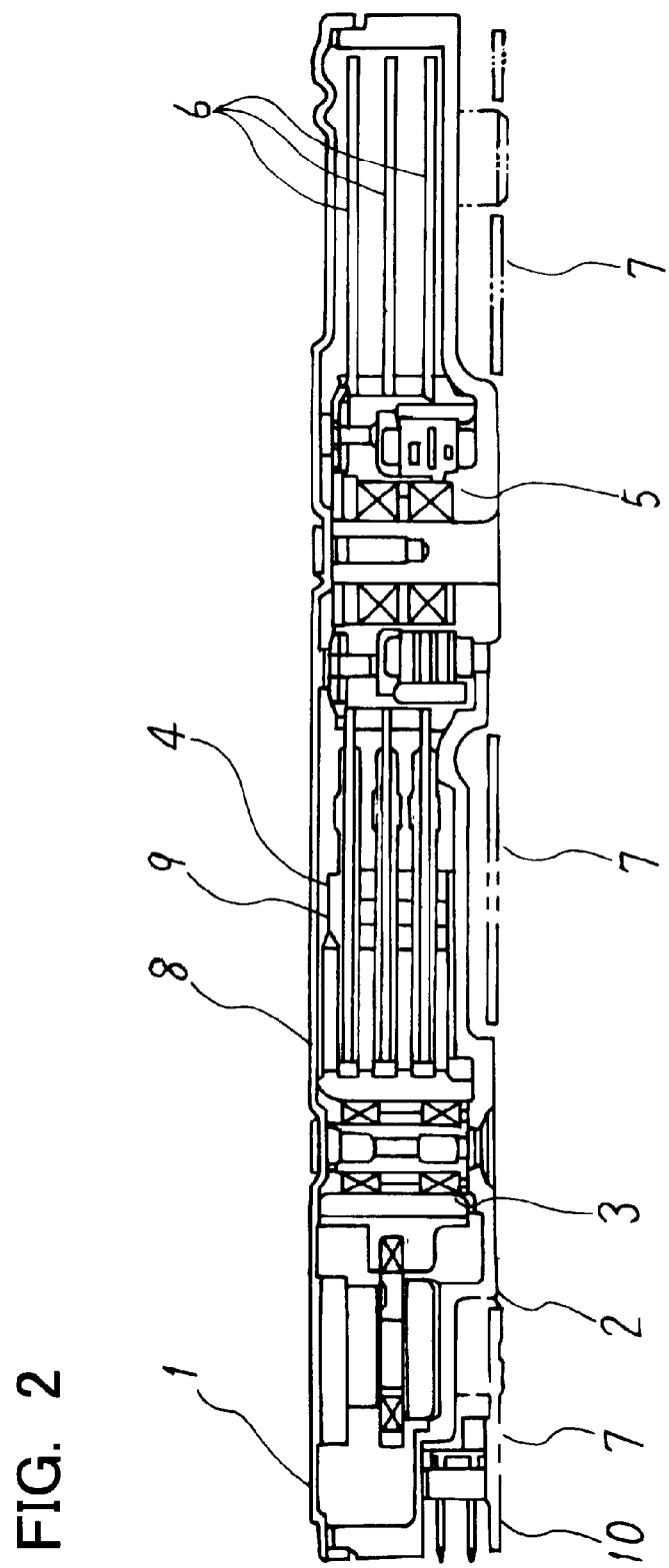
FIG. 2 is a cross-sectional view of the disk device in FIG. 1.

FIG. 1 is a top view of the disk device of an embodiment of the invention, and FIG. 2 is a cross-sectional view of that disk device. In this embodiment, a hard-disk drive is used as the disk device.

As shown in FIG. 1 and FIG. 2, the magnetic disk 6 has a magnetic storage layer formed on the top of a substrate (disk). The size of the magnetic disk 6 is 2.5 inches, and there are three disks inside of the drive. A spindle motor 5 supports and rotates the magnetic disk 6. A magnetic head 4 is located on the actuator. The actuator comprises a rotating VCM (voice coil motor) 3, arm 8 and flexure (suspension) 9. The magnetic head 4 is attached to the tip of the flexure 9.

The magnetic head 4 reads data from or writes data to the magnetic disk 6. The magnetic head 4 comprises an MR element (reading element) and writing element. An actuator 3 positions the magnetic head 4 at a desired track on the magnetic disk 6. The actuator 3 and spindle motor 5 are located at the drive base 2. A cover 1 covers the drive base 2 and separates the internal parts of the drive from the outside. A printed circuit board 7 is located underneath the drive base 2, and the drive control circuit is mounted on it. A connector 10 is located underneath the drive base 2 and it connects the control circuit to the outside. This drive is compact and its dimensions are 90 mm (width)×63 mm (height)×10 mm (depth). It is used as the internal disk drive for a notebook personal computer.

Figure 3:
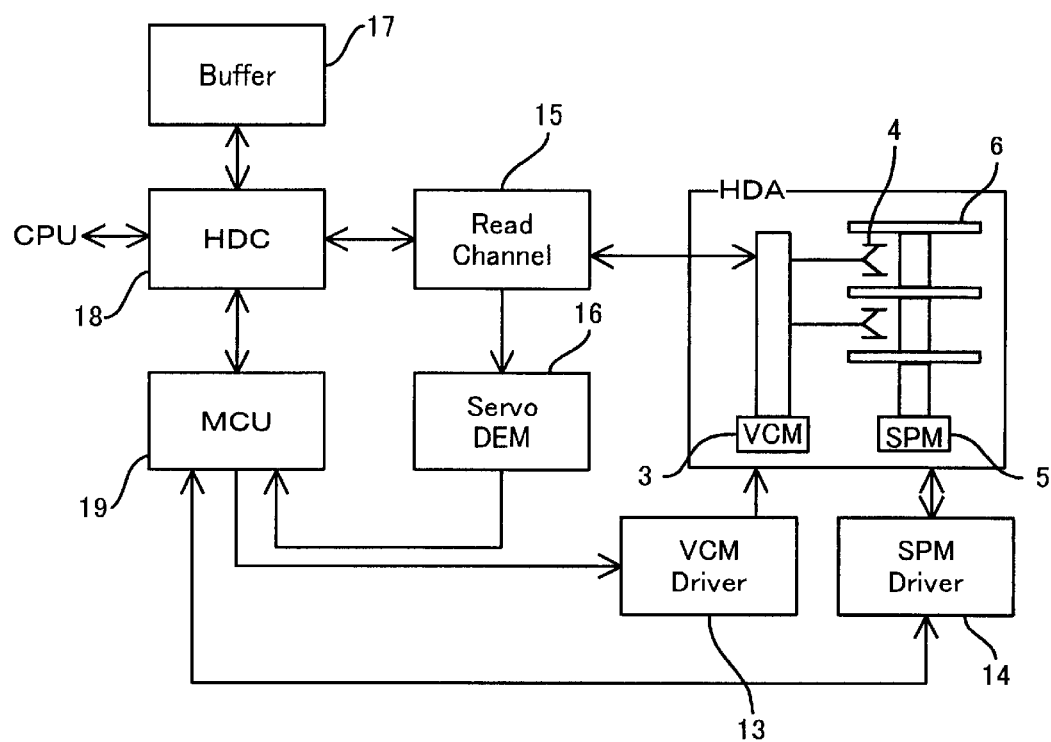
FIG. 3 is a block diagram of the disk device in FIG. 1.

FIG. 3 is a block diagram of the control circuit located on the printed circuit board 7 in the drive. A HDC (hard disk controller) 18 receives commands from the host CPU, and controls the interface with the host CPU from which data are received, and generates control signals inside the magnetic disk device for controlling the read/write format of the magnet disk medium. A buffer 17 is used for temporarily storing write data from the host CPU and for temporarily storing read data from the magnetic disk medium.

An MCU (micro controller) 19 comprises a microprocessor (MPU), memory, DA converter and AD converter. The MCU (called MPU below) 19 performs servo control (positioning control) for positioning the magnetic head. The MPU 19 executes a program that is stored in memory, recognizes the position signal from the servo demodulation circuit 16, and calculates the control value for the VCM control current of the actuator 3 that positions the head. Furthermore, the MPU 19 controls the drive current of the SPM drive circuit 14.

The VCM drive circuit 12 comprises a power amp for sending the drive current to the VCM (voice coil motor) 3. The SPM drive circuit 14 comprises a power amp for sending drive current to the spindle motor (SPM) 5, which rotates the magnetic disk.

Figure 5:
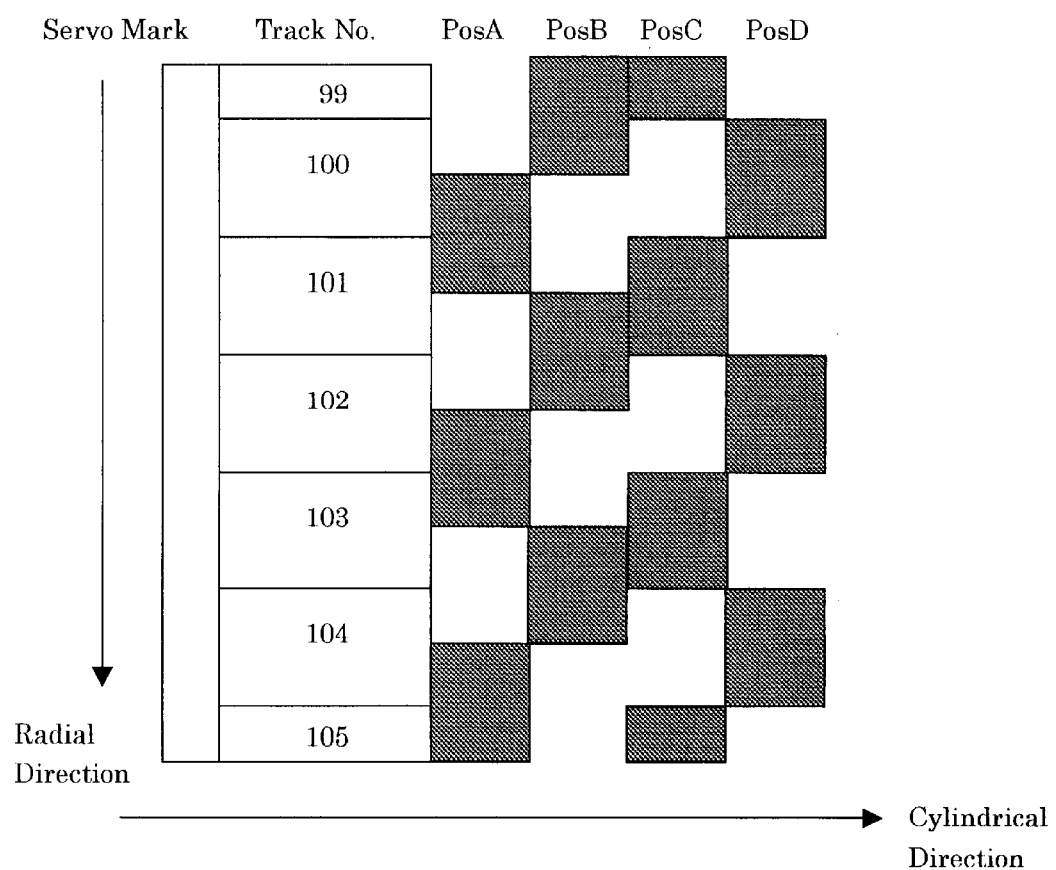
FIG. 5 is a drawing explaining the servo pattern in FIG. 4.
Figure 6:
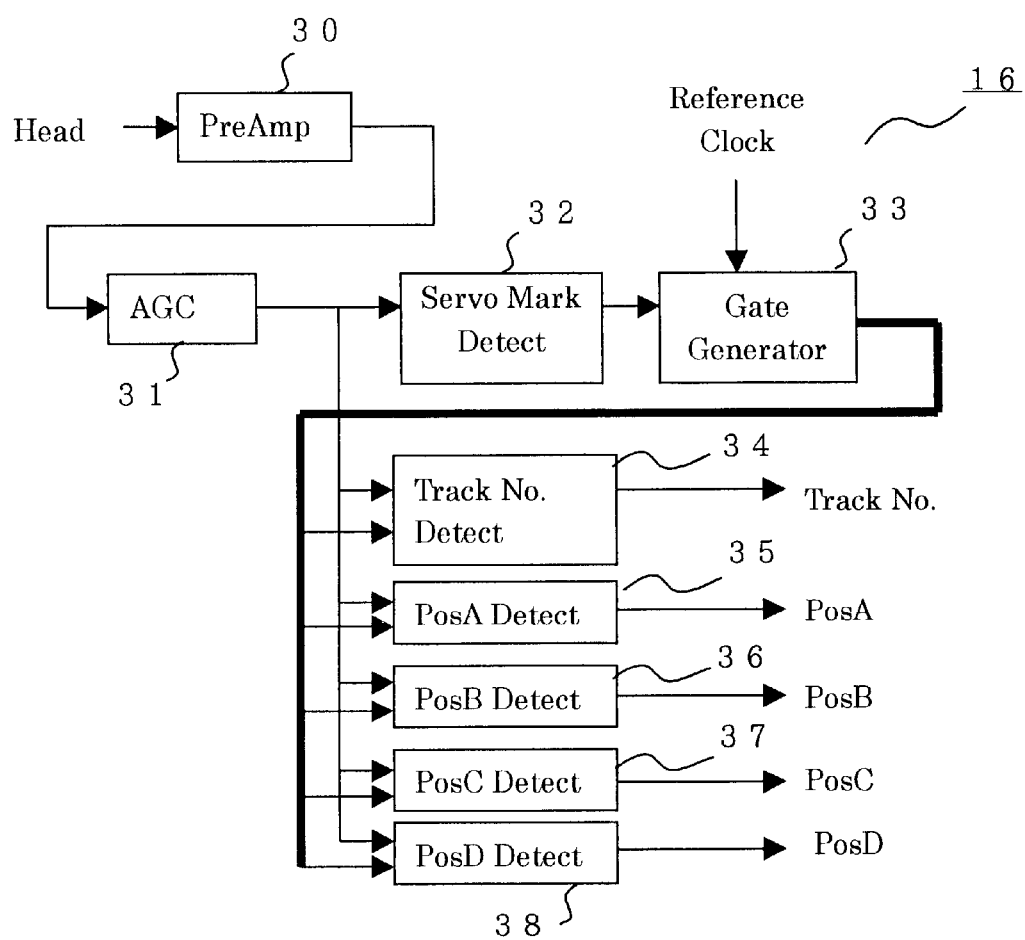
FIG. 6 is a block diagram of the servo demodulation circuit in FIG. 4.

A read channel 15 is a circuit for reading or writing. The read channel 15 comprises a modulation circuit for writing write data from the host CPU to the magnetic disk medium 6, a parallel-to-serial conversion circuit, a demodulation circuit for reading data from the magnetic disk medium 6, and a serial-to-parallel conversion circuit. The servo demodulation circuit 16, as described later in FIG. 6, is a circuit that demodulates the servo pattern (described later in FIG. 5) that is written on the magnetic disk medium 6, and outputs the position signal to the MPU 19.

It is not shown in the figure, however inside the drive HDA, there is a head IC on which there is a write amp, which supplies write current to the magnetic head 4, and a preamp, which amplifies the read voltage from the magnetic head 4.

Here, an example of a magnetic disk device is explained as the disk device, however, an optical disk device, such as a DVD or MO could also be used. Also, here a device capable of reading or writing was explained, however it is also possible to use a read only device.

Positioning Control System

Next, the positioning control system, that the MPU 19 executes, is explained.

Figure 4:
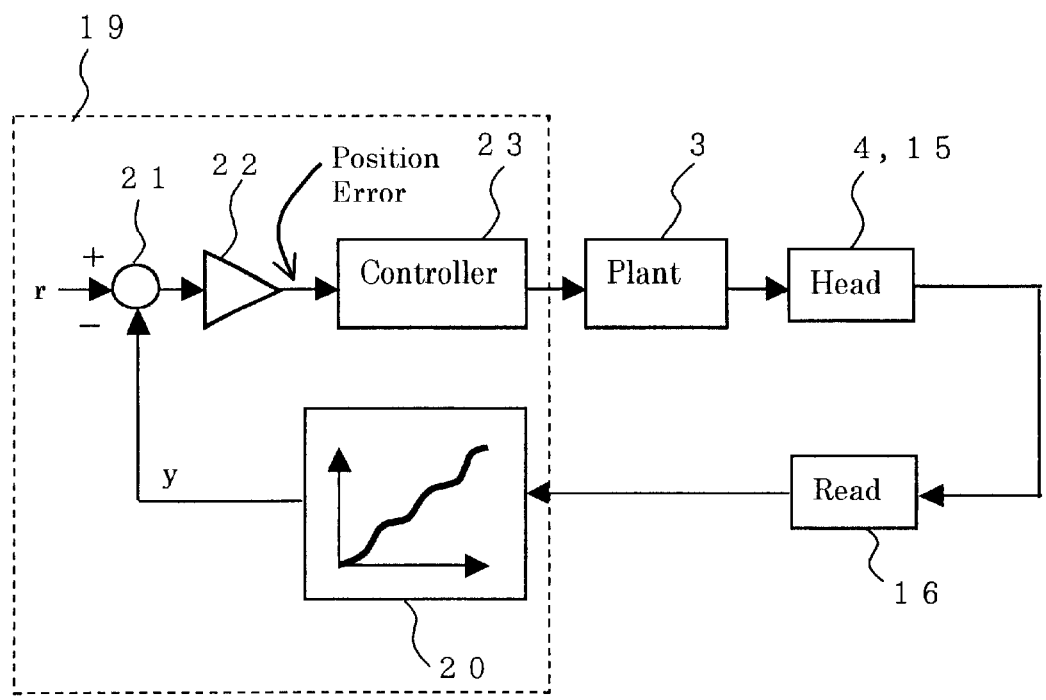
FIG. 4 is a block diagram of the positioning control of an embodiment of the invention.
Figure 7:
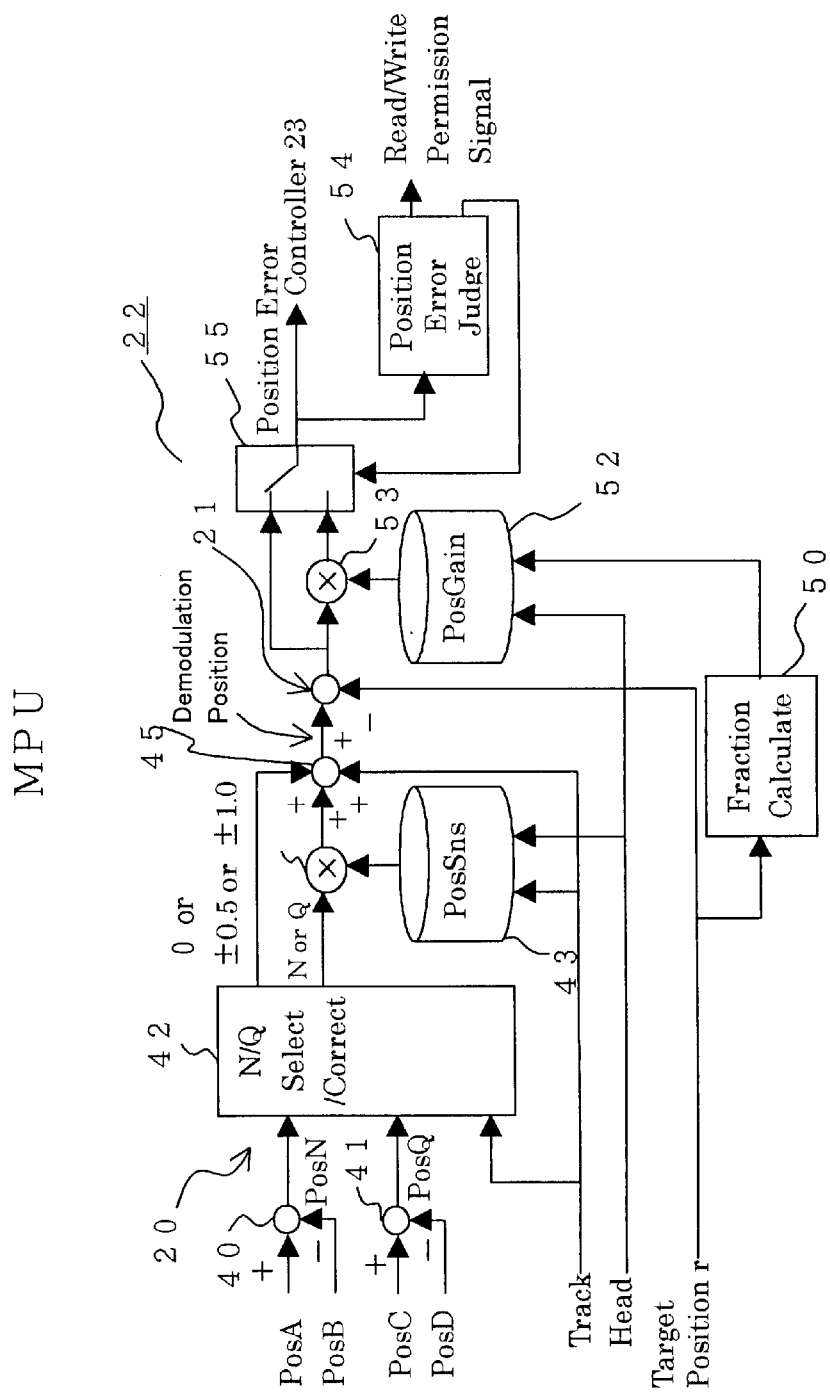
FIG. 7 is a block diagram of the MPU function in FIG. 4.
Figure 8:
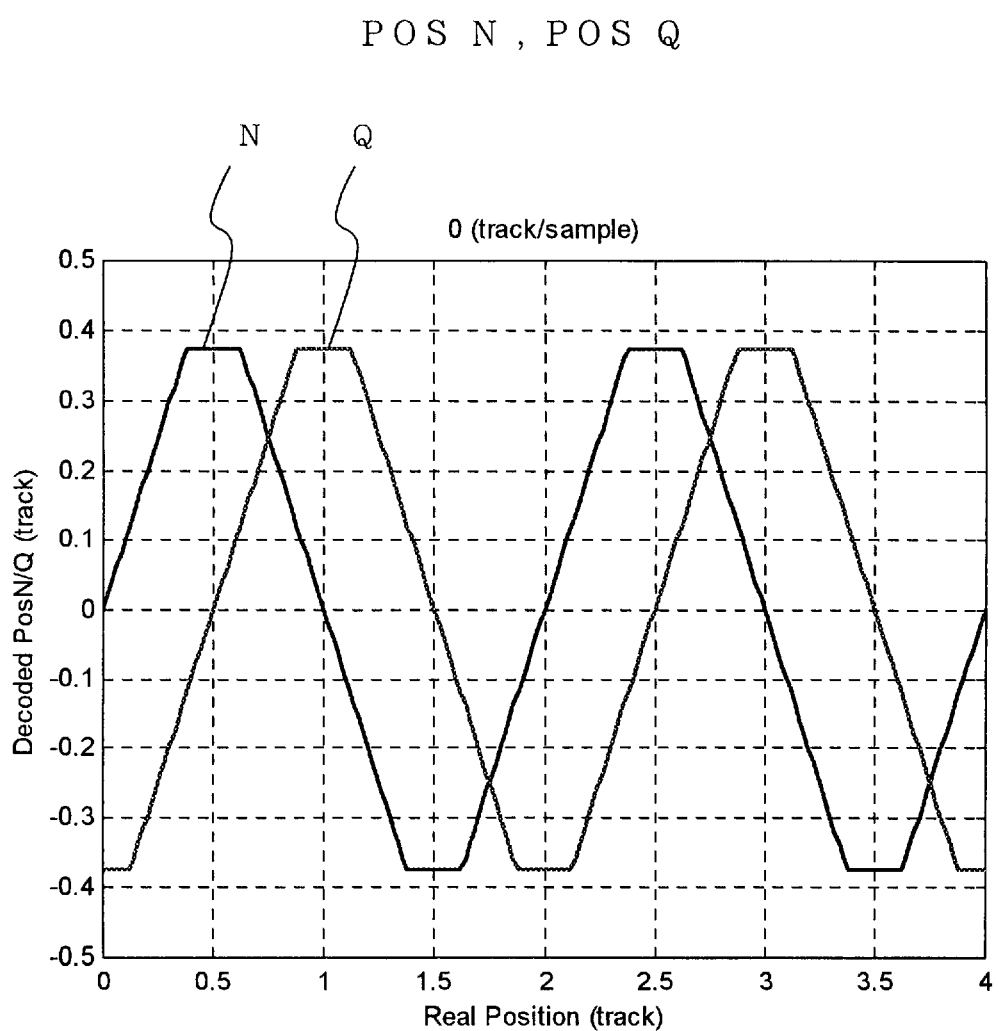
FIG. 8 is a drawing explaining POSN and POSQ in FIG. 7.
Figure 9:
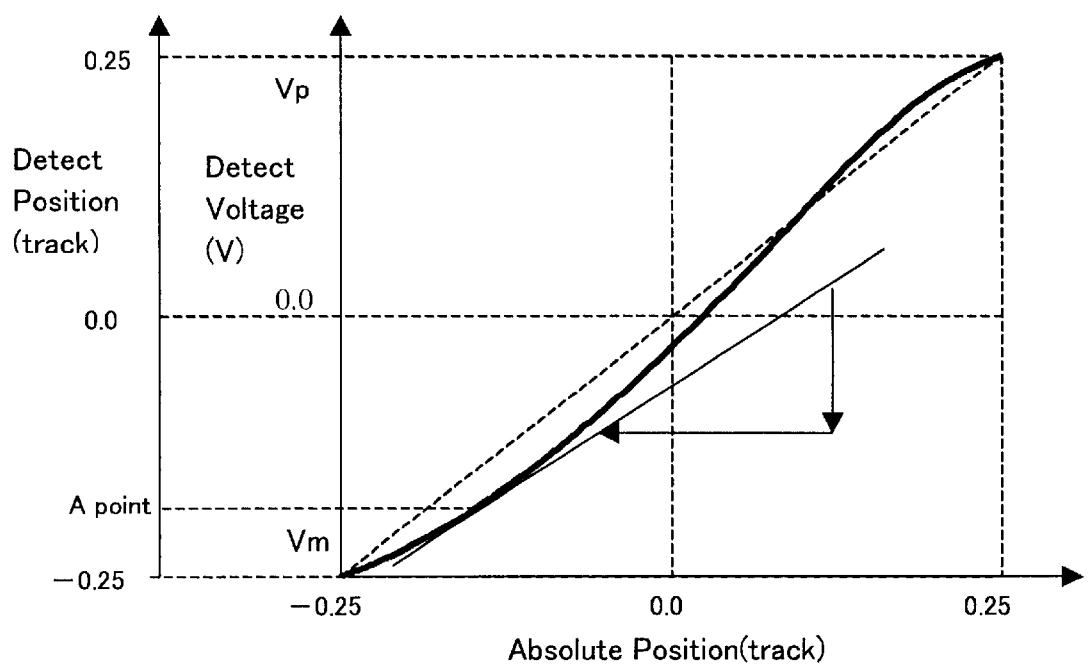
FIG. 9 is a drawing explaining the POSGAIN table in FIG. 7.
Figure 10:
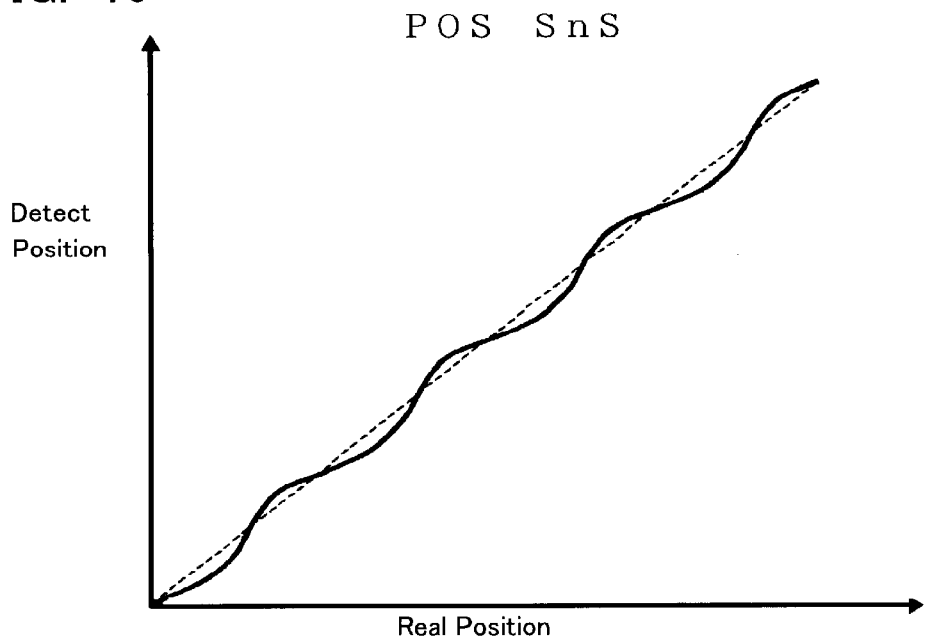
FIG. 10 is a configuration diagram of the POSSnS table in FIG. 7.
Figure 11:
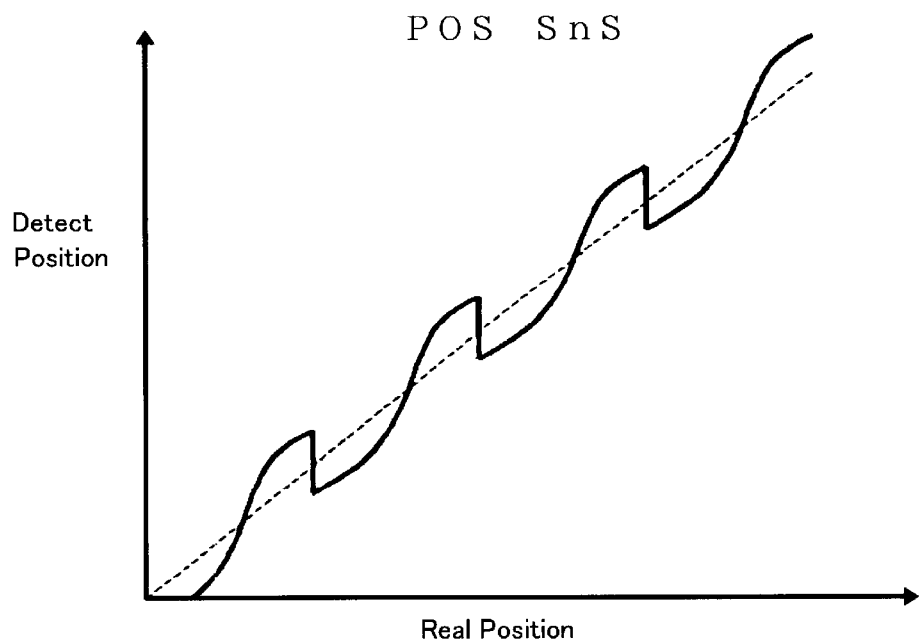
FIG. 11 is a drawing explaining the POSSnS table in FIG. 7.
Figure 12:
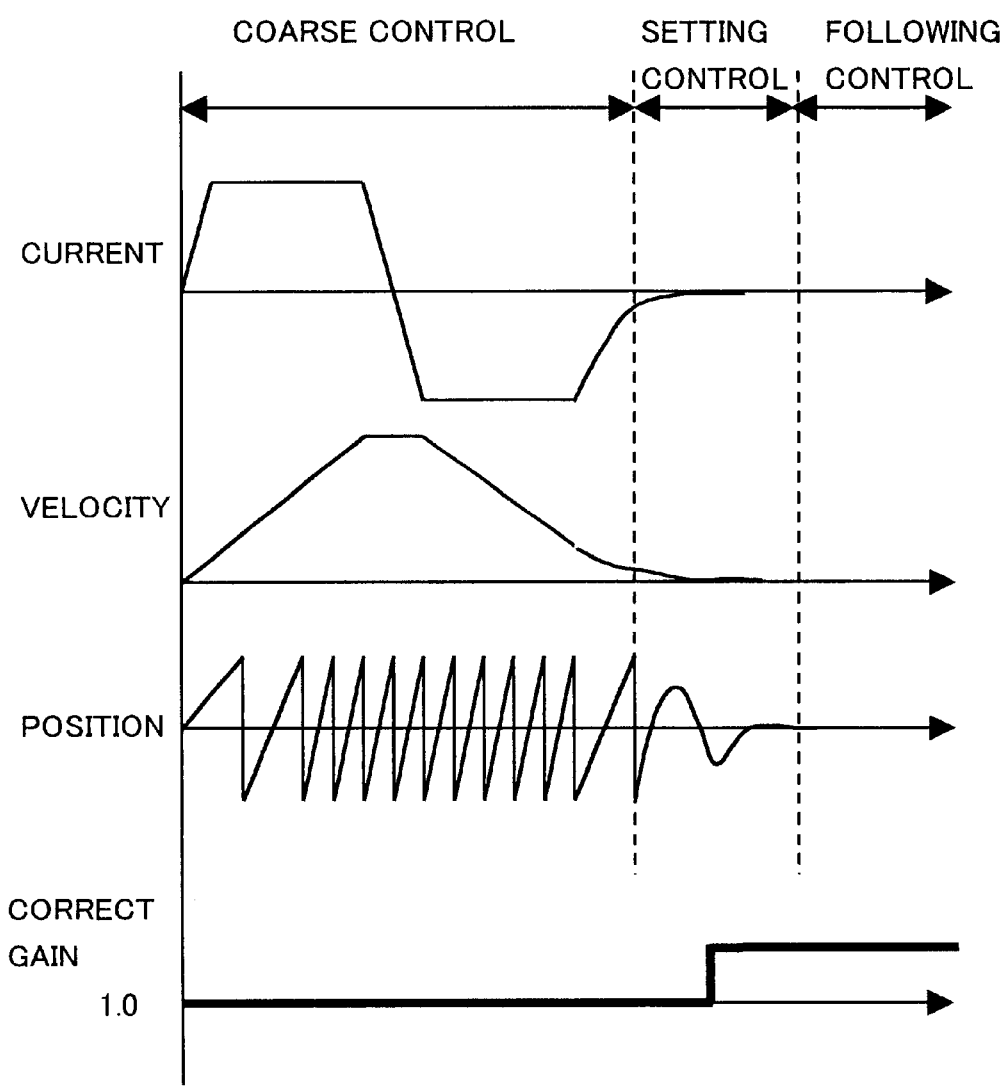
FIG. 12 is a drawing explaining the gain change in FIG. 7.

FIG. 4 is a block diagram of the positioning-control system. FIG. 5 is a drawing explaining the servo pattern of the magnetic disk. FIG. 6 is a block diagram of the servo demodulation circuit in FIG. 4. FIG. 7 is a block diagram of the function of the MPU 19 in FIG. 4. FIG. 8 is a drawing explaining POSN and POSQ in FIG. 7. FIG. 9 is a drawing explaining the POSGAIN table in FIG. 7. FIG. 10 and FIG. 11 are drawings explaining the POSSnS table, and FIG. 12 is a drawing explaining the gain change in FIG. 7.

As shown in FIG. 4, the positioning-control system comprises a MPU 19, VCM 3, magnetic head 15 and servo-demodulation circuit 16. The MR head of the magnetic head 15 reads a servo pattern from the magnetic disk 6. A servo pattern is written in each sector on the magnetic disk 6 using a sector servo format.

As shown in FIG. 5, this servo pattern comprises a servo mark, track number, and four burst servo signals PosA, PosB, PosC and PosD. The servo mark indicates the start of the servo pattern. The track number indicates the track address. The burst servo signals PosA, PosB, PosC and PosD are patterns that are written in ½-track units and used to indicate the offset position from the center of the track.

The servo-demodulation circuit 16 in FIG. 4 is explained using FIG. 6. A preamp 30 amplifies the read signal of the MR head 15. An AGC (auto gain control) circuit 31 adjusts the gain of the read signal, and controls the amplitude of the read signal. A servo-mark detection circuit 32 detects the servo mark, that is shown in FIG. 5, from the read signal.

When the servo mark is detected, a gate-signal generator circuit 33 generates a gate signal for detectors 34 to 38, that are synchronized to a clock. A track-number detector 34 detects the track number in FIG. 5 according to the gate signal, and outputs the track number. A PosA detector 35 detects the burst servo signal PosA in FIG. 5, and outputs that amplitude as PosA.

A PosB detector 35 detects the burst servo signal PosB in FIG. 5, and outputs that amplitude as PosB. A PosC detector 35 detects the burst servo signal PosC in FIG. 5, and outputs that amplitude as PosC. A PosD detector 35 detects the burst servo signal PosD in FIG. 5, and outputs that amplitude as PosD.

In returning to FIG. 4, The MPU 19 comprises a position demodulation unit 20, error calculation unit 21, gain correction unit 22, and controller 23. These components divide the function of the MPU 19 into blocks.

The controller 23 is a well known servo controller that calculates the control amount according to the position error. The servo controller 23 executes coarse control, integral control or following control according to the position error. Coarse control is velocity control to the target position. Coarse control comprises velocity control, PD control or observer control that does not include steady-state bias estimation. As shown in FIG. 12, coarse control switches the control mode among acceleration, constant velocity, or deceleration. The acceleration mode sends current and controls acceleration the velocity. The constant-velocity mode sets the current to '0', and keeps the velocity constant. The deceleration mode sends current in the opposite direction of the acceleration mode and brings the velocity near zero in the vicinity of the target position. When the distance is small, there is no constant velocity mode.

Following control controls the magnetic head such that it follows the target position. Following control comprises PID control, PI×Lead-Lag, or observer control that includes steady-state bias estimation. Integral control is the control mode for connecting coarse control and following control. In integral control, an integral element is included in the control system.

The position demodulation unit 20 in FIG. 4, as described later in FIG. 7, calculates the demodulated position from the track number and PosA, PosB, PosC and PosD from the servo-demodulation circuit 16. The error calculation unit 21 subtracts the demodulated position y from the target position r, and calculates the position error before correction. The gain-correction unit 22, as described later in FIG. 7, corrects the position error before correction using the correction gain, and outputs the corrected position error. The corrected position error is input to the controller 23.

FIG. 7 is a detailed block diagram of the position-demodulation unit 20, error-calculation unit 21 and gain-correction unit 22 of the MPU 19. The position-demodulation unit 20 comprises a PosN calculation unit 40, PosQ calculation unit 41, N/Q selection and correction unit 42, PosSns table 43, multiplier 44, and adder 45.

The PosN calculation unit 40 subtracts PosB from PosA, and calculates the PosN signal. The PosQ calculation unit 41 subtracts PosD from PosC and calculates the PosQ signal. As shown in FIG. 8, by doing this, the well known 2-phase PosN and PosQ servo signals that are out of phase by 90 degrees are obtained.

There is a N/Q selection and correction unit that uses the linear part of the PosN and PosQ to obtain the offset position. The selection and correction unit 42 compares the absolute values abs (PosQ) and abs (PosN) of PosQ and PosN. When abs (PosQ)>=abs (PosN)n then PosN is selected, otherwise PosQ is selected. In other words, the selection and calculation unit 42 outputs N=−sgn(PosQ) and PosN when abs(PosQ)>=abs(PosN), otherwise it outputs Q=sgn(PosN) and PosQ. sgn is the code number.

Furthermore, the selection and correction unit 42 determines whether the track number Track is an odd track or an even track, and when it is an odd track, even(Track) is taken to be '−1', and when it is an even track, even(Track) is taken to be '+1'. Also, when PosN is selected, and [sgn(PosQ) *even(Track)]>0.0, then the unit outputs sgn(PosQ)*sgn (PosN)*1.0. This value, is +−1.0. In all other cases, '0' is output. Also, when PosQ is selected, even(Track)*0.5 is output.

PosN and PosQ are used alternately in ½-track units, so the PosSns table 43 stores the sensitivity gain for doing away with any unevenness when changing. There is a sensitivity gain for each track and head. As shown in FIG. 10, this sensitivity gain is set such that the demodulated position (detected position) is continuous with respect to the real position, even though PosN and PosQ are used alternately. As shown in FIG. 11, when this sensitivity gain is not set, the detected position is not continuous with respect to the real position when PosN and PosQ are used alternately, and unevenness occurs at the position where PosN and PosQ are changed.

The multiplier 44 multiplies the output, N or Q, of the selection and correction unit 42 by the sensitivity gain PosSnsTable(Head, Track). The adder 45 adds the output of the track number the multiplier 44, and the output '0', '+−0.5' or '+−1.0' of the selection and correction unit 42, and calculates the demodulated position y.

The demodulated position that is obtained from PosN and PosQ is expressed by the following equations in a C-language program.

```
if (abs(Pos N) <= abs(PosQ)) {
    Position = −sgn(PosQ) * PosSnsTable(Head, Track) * PosN + Track;
        if (sgn(PosQ)*even(Track)>0.0)
            Position+= sgn(PosQ) * sgn(PosN) * 1.0;
} else {
    Position = sgn(PosN) * PosSnsTable(Head, Track) * PosQ + even(Track) * 0.5}+Track;
}
```

The error-calculation unit 21 subtracts the target position from the demodulated position, and outputs the position error before correction. The gain-correction unit 22 comprises a remainder calculation unit 50, PosGain table 52, multiplier 53, position-error judgment unit 54, and switching unit 55.

The PosGain table 52 stores position gain for the position error of the offset from the target position. In other words, in the above example, the servo pattern is written in ½-track units, and the position gain is set for each amount that the target position is POSN and PosQ have shifted from the '0' center of PosN and PosQ. As shown in FIG. 9, this position gain is set such that the relationship between the demodulated position (detected position, detected voltage) and absolute position, is corrected from a relationship such as that shown by the solid line in the figure, to a linear and proportional relationship as shown by the dotted line in the figure.

The remainder-calculation unit 50 calculates the amount that the target position Target Pos has shifted from the '0' center of PosN and PosQ. In other words, it calculates the remainder Xmod in ½-track units, as shown below.

$$Xmod = mod((\text{Target } Pos + 0.25), 0.5) − 0.25$$

The PosGain table 52 is accessed according to head number and the amount of shift (remainder), and it outputs the corresponding position gain. The multiplier 53 multiplies the position error from the error-calculation unit 21 by the position gain. From this, the corrected position error is obtained.

The switching unit 55 selects position error to be output to the controller 23 from the position error before correction and the position error after correction. The position-error-judgment unit 54 determines whether the position error from the switching unit 55 is within the number of tracks for the read condition, or within the number of tracks for the write condition, and then issues permission to read or write. Moreover, the position-error-judgment unit 54 switches the switching unit 55 according to the position error.

The meaning of this switching is explained in FIG. 12. As described above, the controller 23 switches to and executes coarse control, integral control or following control accord to the position error. Coarse control is velocity control and moves to the track. When the position gain is selected according to the aforementioned amount of shift, the correct gain is not shown for the position gain since the head is moving to the tracks. Therefore, the position error is amplified too much, and it is not possible to smoothly perform coarse control. In order to prevent this, the position gain is set to '1' during coarse control. Therefore, the switching unit 55 selects the position error before correction during coarse control.

In the example shown in FIG. 12, when the position-error-judgment unit 54 switches the switching unit 55 from the position error before correction to the position error after correction when the position error is in the position error range for integral control. In this way, it is possible to limit the step of correcting the position error to the necessary following control, which makes it possible to prevent adverse effects on coerce control.

Since the position gain is set for the relative amount of shift from the target position, and the position error between the target position and demodulated position is corrected by the position gain, it is possible to obtain accurate position error for which the non-linear characteristics of the head have been corrected even when using a distorted position.

Therefore, non-linear correction which corresponds to the characteristics of the device and individual head is possible. Moreover, since it is a relative position, measurement of the correction gain for the device itself is possible. Furthermore, since the position error is corrected, it is possible to correct the error to the accurate position error, and thus it is possible to accurately detect the starting point of reading or writing. In addition, since the accurate position error is obtained, the control system of the controller is not limited. In particularly, it is suitable for when using observer control.

Gain Measurement Process

As described above, since a relative position is used, it is possible to measure the position gain for the device itself. An effective measurement method for doing this is explained using FIG. 13 through FIG. 15.

Figure 13:
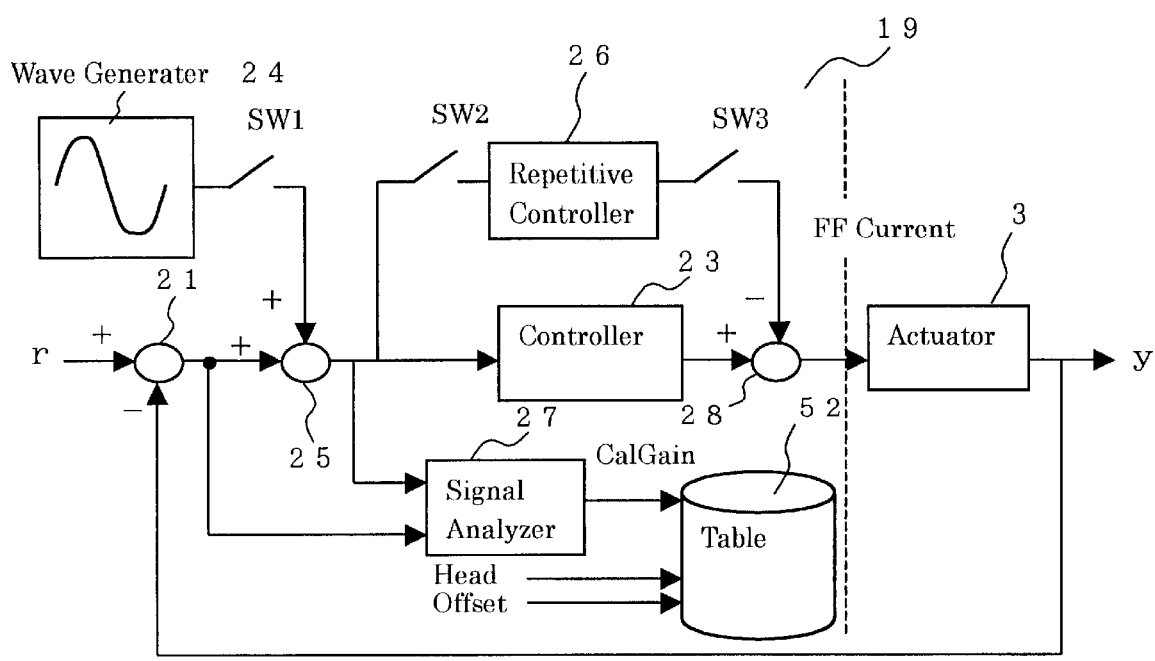
FIG. 13 is a block diagram of the gain measurement in an embodiment of the invention.
Figure 14:
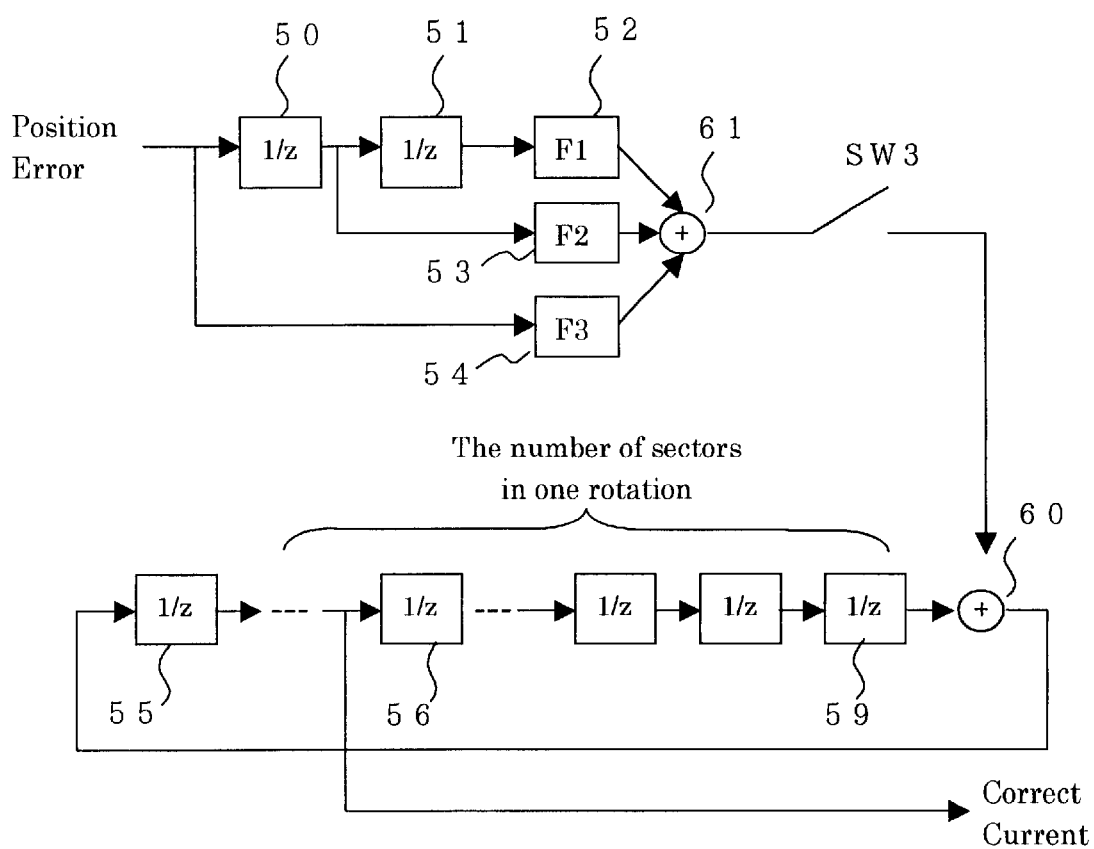
FIG. 14 is a block diagram of the repetitive controller in FIG. 13.
Figure 15:
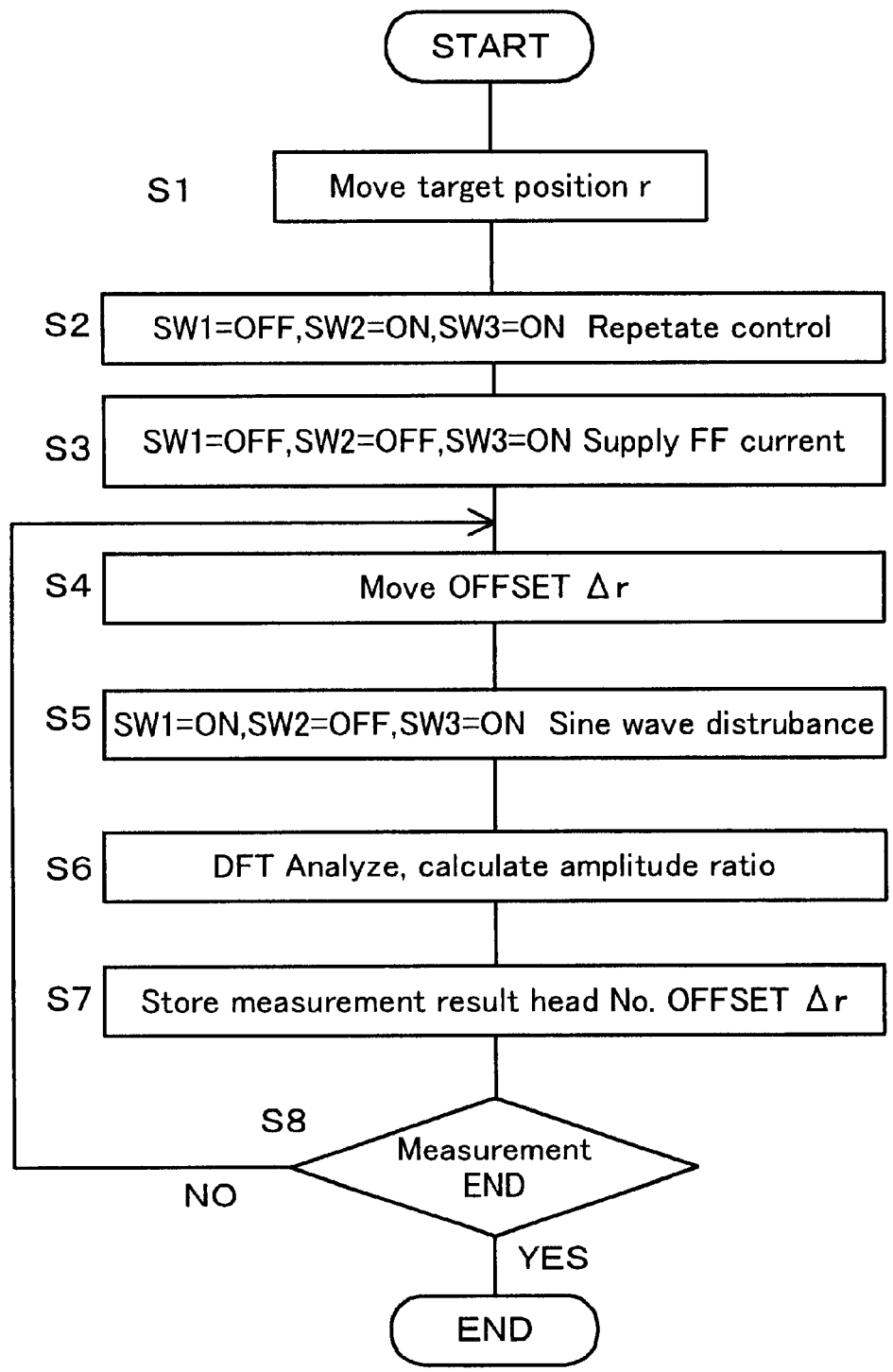
FIG. 15 is a flowchart of the gain measurement process in FIG. 13.

FIG. 13 is a block diagram of the gain measurement used in an embodiment of this invention. FIG. 14 is a block diagram of the repetitive controller and FIG. 15 is a flowchart of the gain measurement process of an embodiment of the invention.

The system shown in FIG. 13 gives a position offset with point '0' of PosN or PosQ as the center. Also, by measuring the loop gain at that point, the position gain, that is dependent on the head sensitivity distribution, is measured.

In order to do that, there is a waveform generator 24 which generates a sinusoidal external disturbance. The sinusoidal external disturbance is added by the adder 25 to the position error between the target position r and the demodulated position y that is obtained from the error-calculation unit 21. This is then input to the controller 23, and the control amount is output for the actuator 3. The position gain when doing this is set to '1'.

In addition, there is a signal analyzer 27 that obtains and compares the amplitude of the frequency component of the sinusoidal external disturbance of the signal before and after adding the external disturbance. This signal analyzer 27 obtains the frequency component of the sinusoidal external disturbance of the signal before and after the adder 25 adds the external disturbance, and it compares the amplitude. This signal analyzer 27 can be a Digital Fourier Transform(DFT).

Here, in order to measure the gain of such a minute region, the amplitude of the sinusoidal external disturbance must be small. originally, the positioning precision was +−0.07 to 0.1 tracks, so when a sinusoidal external disturbance is added, the amplitude of the position fluctuation increases and the gain is measured for a large range, making it difficult to measure the gain for a minute area.

Therefore, there is a repetitive controller 26 that performs repetitive control for directly measuring the loop gain. Repetitive control is a control method for removing the rotational synchronization component (RRO) of the position error. As shown in FIG. 14, the repetitive controller 26 has the same number of delay circuits (1/z) 55 to 59 as sectors in one revolution of the magnetic disk. These delay circuits 55 to 59 create a correction current that is suitable for removing the rotational synchronization component RRO at the same time the adder 60 adds the position error value. In addition, when the switch SW3 shown in the figure is turned OFF, suitable correction current is maintained in the delay circuits 55 to 59, and that value is not changed.

First, all of the delay circuits 55 to 59 are reset to '0'. Next, the current position error is added to the value of the delay circuit before rotation (output of delay circuit 59) by the adder 60. This added value is created by multiplying the values of the delay circuits 50, 51, that delay the position error from the calculation unit 25, by the gain by the gain multipliers 52 to 54, and then adding those values by the adder 61.

In the example in the figure, the values of position error for the past three sectors is multiplied by the gain, and added to create the added value. The gain is set by the setting method of an FIR filter. In other words, a low-pass filter.

By adding the current position error to the position error of the previous rotation, it is possible to a correction current (FF current) for removing the rotational synchronization component. Here, the position error was used, however, a method of adding the correction current and storing it in the delay circuits can also be used as the repetitive control system.

Next, the loop gain is measured for each offset while changing the offset position a little at a time. The measurement process is explained below.

(S1) Sets the target position r to the measurement position and moves to the target position.

(S2) Turns OFF switch SW1, turns ON switch SW2 and turns ON switch SW3, operates the repetitive controller 26 and generates the optimum FF current.

(S3) After being stopping a specified amount of time, it turns OFF switch SW1, turns OFF switch SW2 and turns ON switch SW3, stops updating the FF current, and supplies only the FF current.

(S4) Shifts the target valuer the amount of the offset value, then moves the actuator 3 the offset amount.

(S5) Turns ON the switch SW1, turns OFF switch SW2, and turns ON switch SW3, then adds sinusoidal external disturbance from the waveform generator 24 to the adder 25.

(S6) Inputs the input and output of the adder 25, or in other words, the waveform before and after the sinusoidal addition, to the signal analyzer 27. The signal analyzer 27 performs DFT, extracts the frequency component of the sinusoidal wave, and calculates the ratio of both inputs.

(S7) Saves this ratio (measurement result), together with the head number and offset position, in the table 52.

(S8) Determines whether measurement has been performed for each offset position for the target position. When measurement is not finished, it changes the offset value returns to step S4. When measurement is finished, it ends gain measurement for the offset position at that target position.

In normal position control, PosN and PosQ are switched at the border between PosN and PosQ, however, in this measurement, precision can be improved by not switching and setting just one or the other.

In this way, it is possible to add sinusoidal external disturbance and measure the gain. Also, since repetitive control is used and the rotational synchronization component is removed from the position error, it is possible to measure the gain accurately.

It is also possible to increase or decrease the amplitude of the sinusoidal external disturbance according to the positioning precision. In other words, it is possible to measure the positioning precision and to provide a sinusoidal external disturbance with an amplitude that is proportional to the positioning precision.

EXAMPLE

Figure 16:
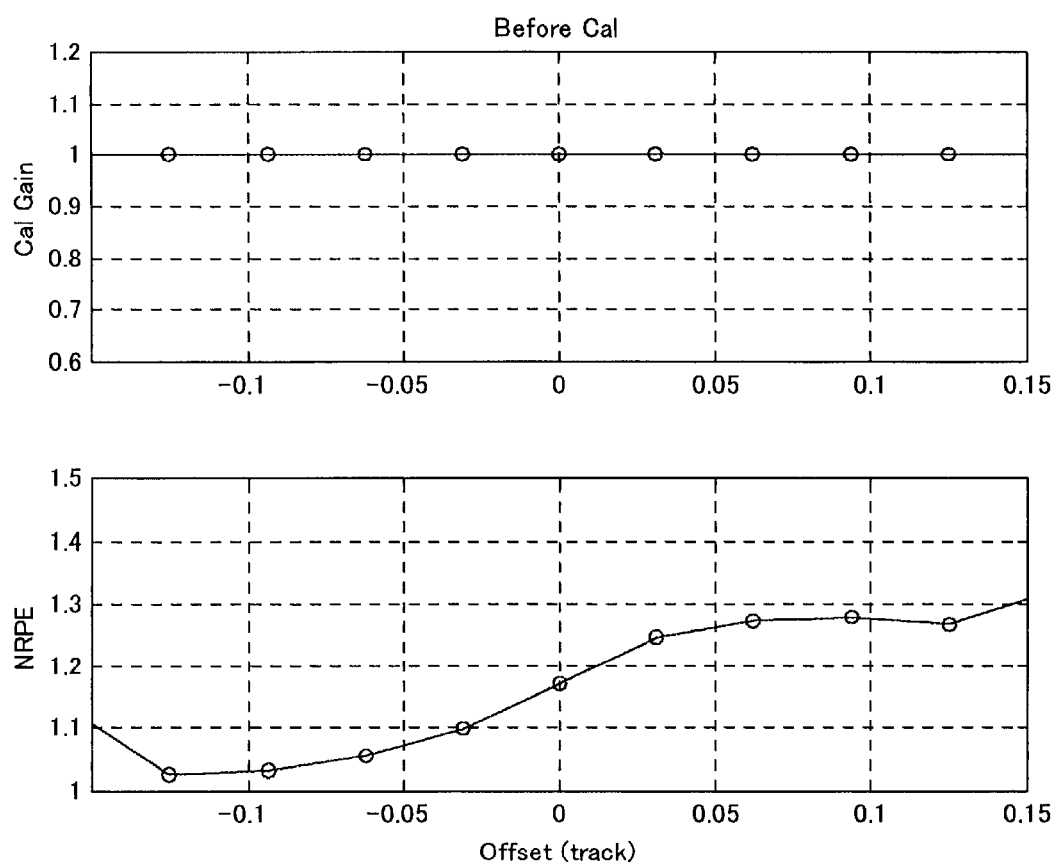
FIG. 16 is a drawing explaining the prior positioning precision for explaining the effect of the invention.
Figure 17:
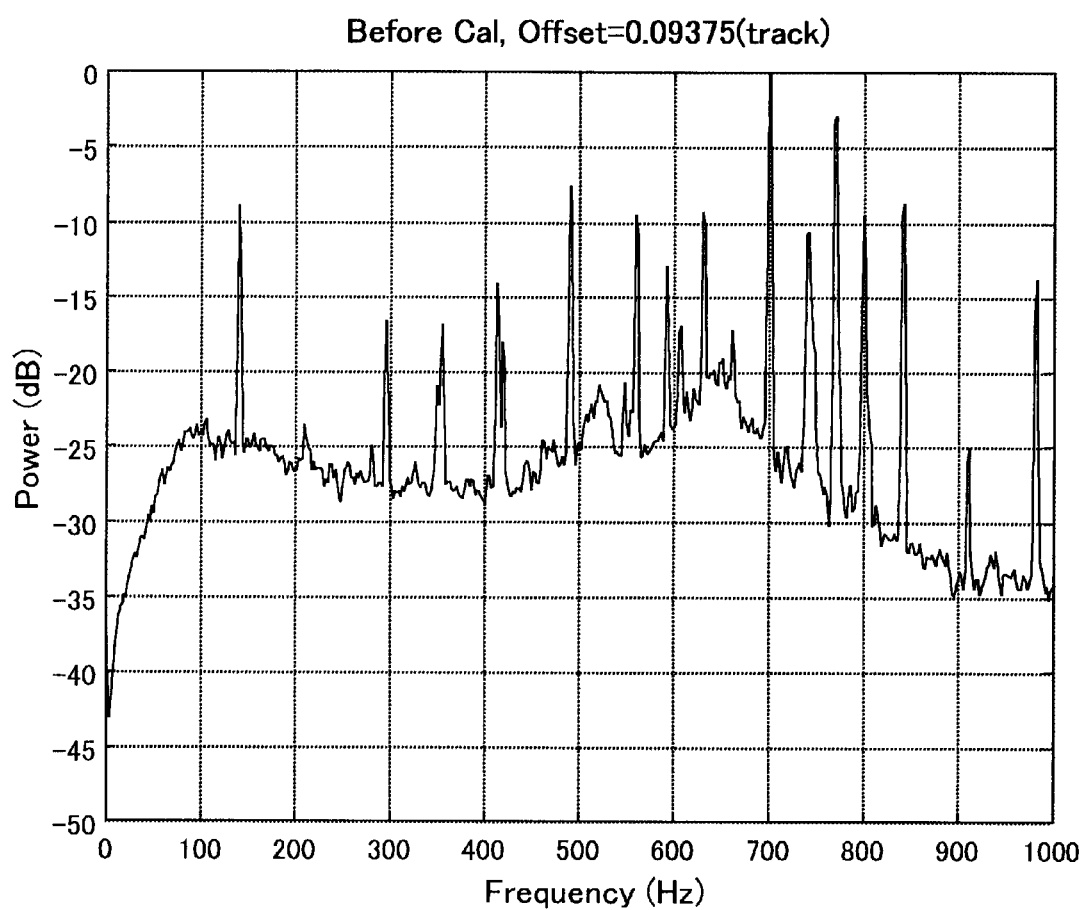
FIG. 17 is a drawing explaining the frequency spectrum of the prior position error for explaining the effect of the invention.

Next, test results will be shown. FIG. 16 shows the positioning precision (TPE and NRPE) before correcting the gain with the invention. FIG. 17 shows the frequency spectrum of the position error before gain correction.

As shown in FIG. 16, when the gain is constant at each offset position, the positioning precision fluctuates and drops. The positioning precision is normalized by the correction of this invention. As shown in FIG. 17, the gain is high, so the power is raised at near 650 Hz. This shows that the positioning precision drops due to the effect of the head sensitivity distribution, because the loop gain differs for each offset position.

Figure 18:
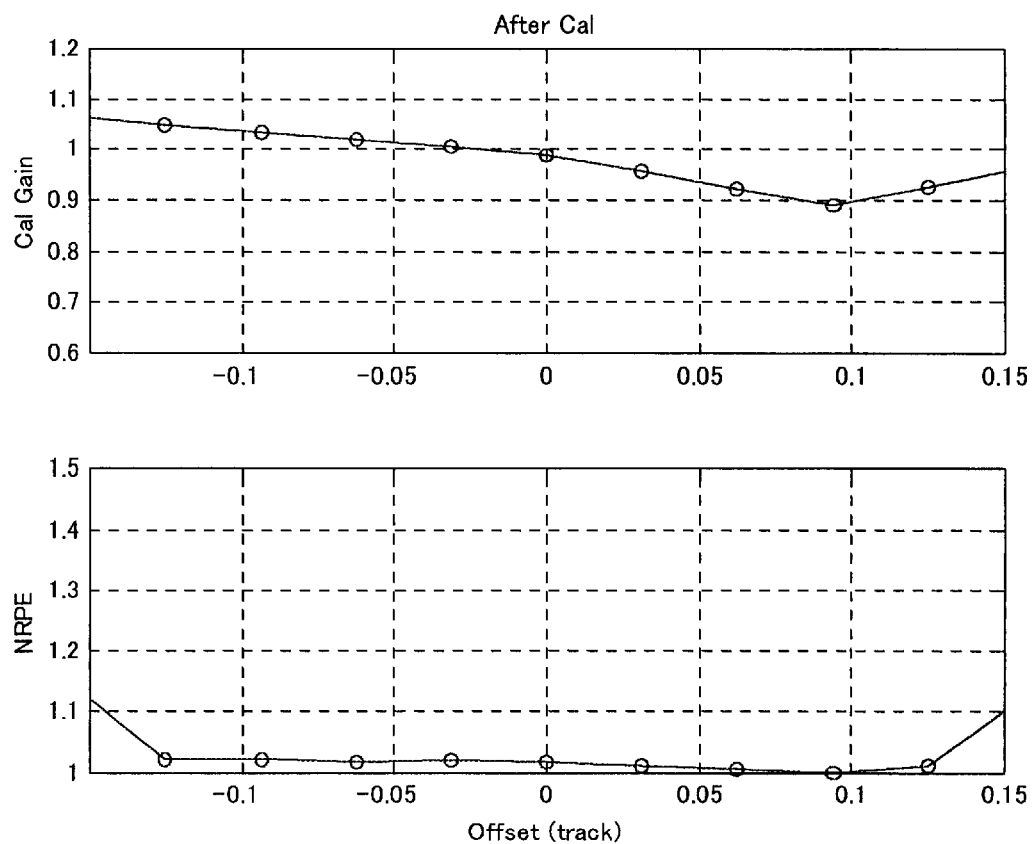
FIG. 18 is a drawing explaining the positioning precision of this invention.
Figure 19:
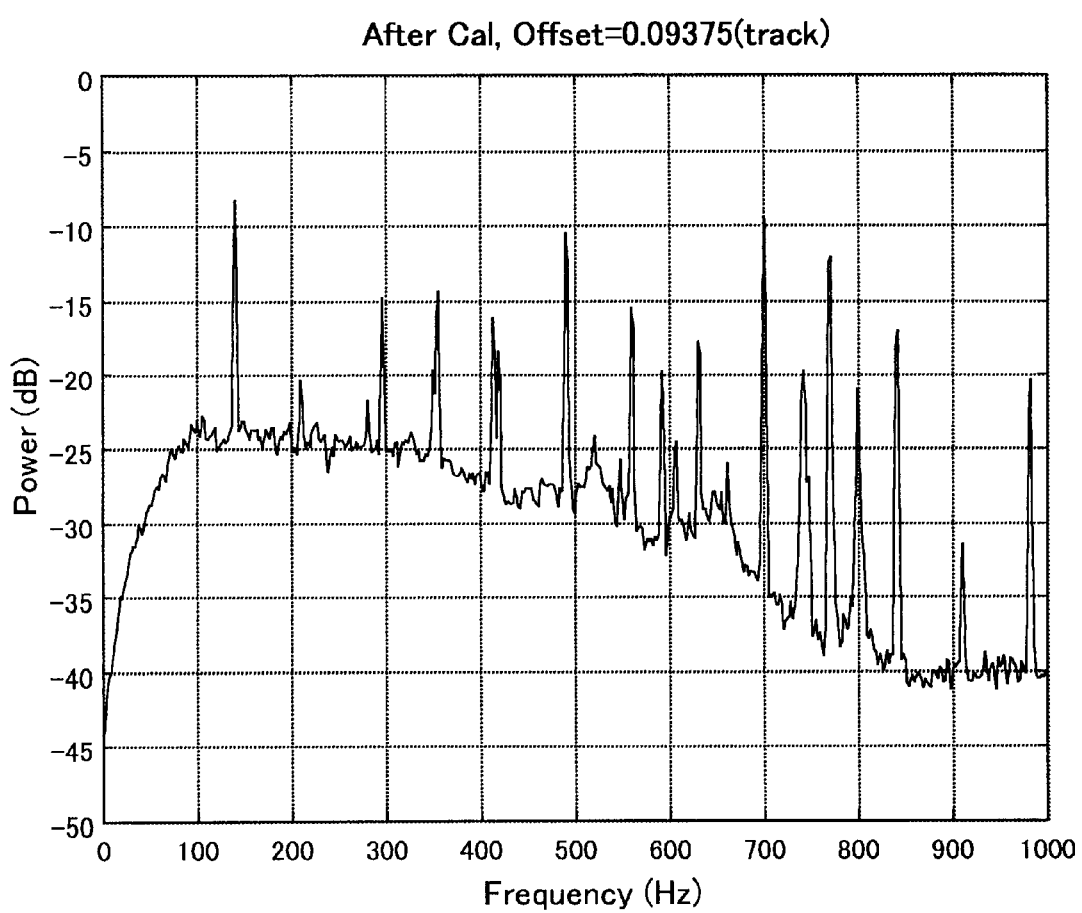
FIG. 19 is a drawing explaining the frequency spectrum of the position error of this invention.

FIG. 18 shows the correction gain by the measure and correction method of this invention, and shows the positioning precision (NRPE) after gain correction. FIG. 19 shows the frequency spectrum of the position error after gain correction.

As shown in FIG. 18, by setting the optimum gain for each offset position, the positioning precision does not change. In other words, this shows that the loop gain is being corrected properly. Moreover, as shown in FIG. 19, since the gain is an optimum value, there is no raise in power near 650 Hz.

Figure 20:
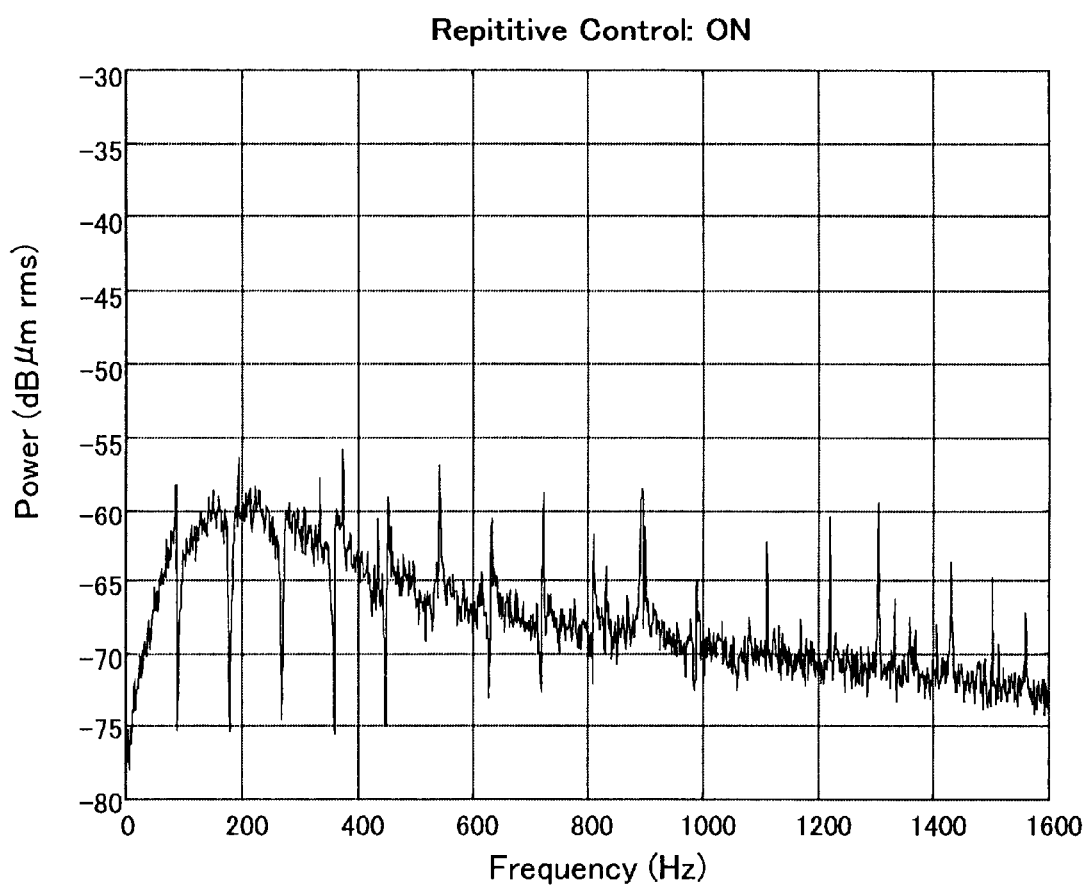
FIG. 20 is a drawing explaining the position error by the repetitive control of this invention.
Figure 23:
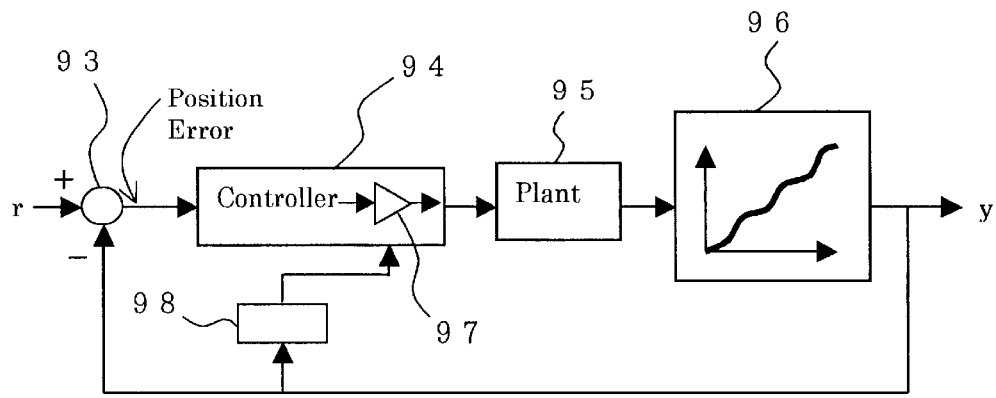
FIG. 23 is a drawing (2/2) explaining the prior art.
Figure 24:
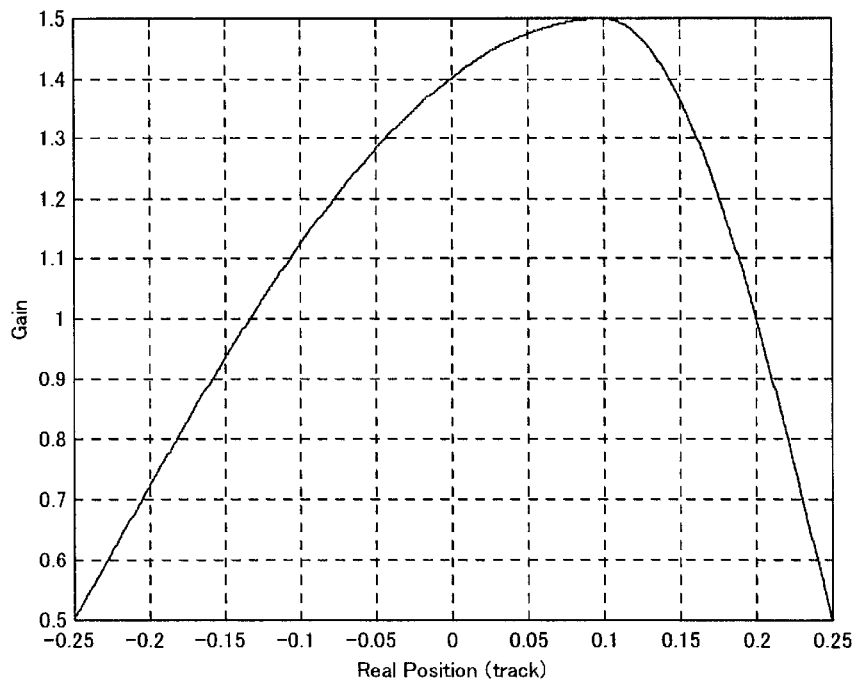
FIG. 24 is a drawing showing the non-linear characteristics of the head and used for explaining the prior art.
Figure 25:
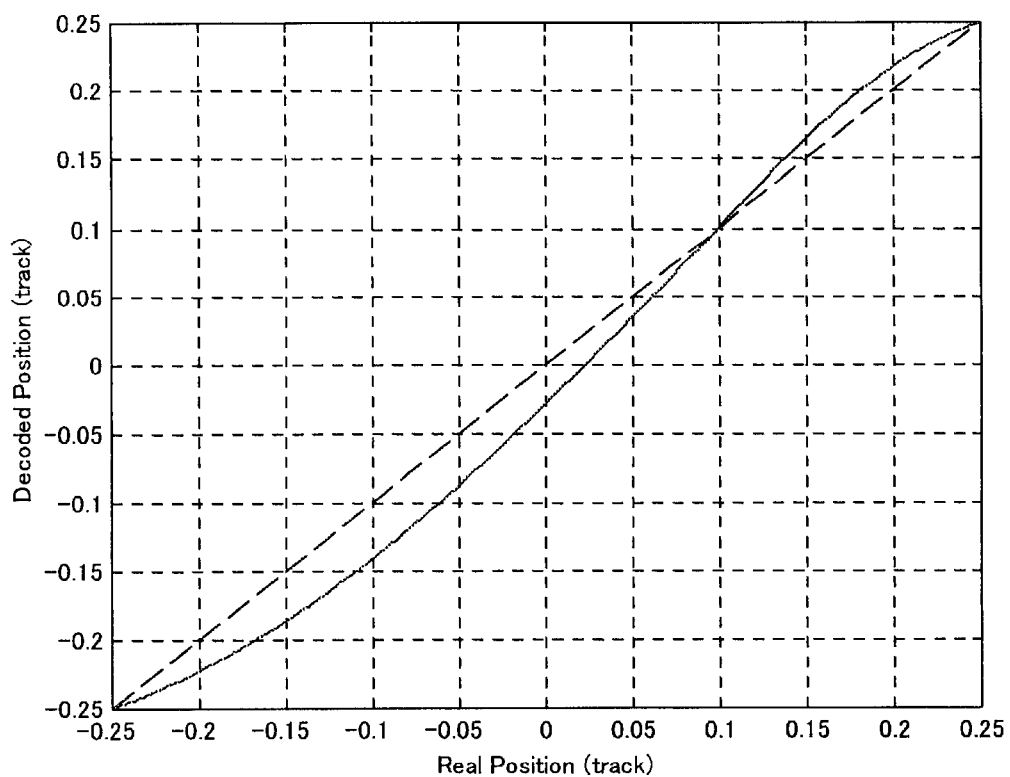
FIG. 25 is a drawing showing the relationship between the detected position and real position and used for explaining the prior art.

Next, the effect of repetitive control during measurement will be explained. FIG. 20 shows the frequency spectrum of the position error after generating the FF current when the repetitive control of this invention is performed, and FIG. 21 shows the frequency spectrum of the position error after generating the FF current when the repetitive control of this invention is not performed.

As can be seen by comparing FIG. 20 and FIG. 21, the rotational synchronization component has been removed from the position error in the case shown in FIG. 20.

OTHER EMBODIMENTS

In addition to the embodiment described above, the invention can be changed as follows:

(1) When measuring the gain, the position gain table, that was measured when manufacturing the disk device, is read, whether or not the amount of change between the gain at the time of manufacture and the gain during measurement is outside a pre-determined range, is determined. When the amount of change is large, the head is determined to be defective, and indicates that the head should be replaced.

(2) The positioning precision is also saved when saving the position gain table. During normal control, the positioning precision is measured and compared with the saved positioning precision. When the positioning precision has become poor, the head sensitivity distribution is measured.

The preferred embodiments of the present invention have been explained, however the invention is not limited to these embodiments and can be embodied in various forms within the scope of the present invention.

As described above, the invention has the following effect:

(1) Since a gain is used for the position error between the demodulated offset value and the target position, correction is performed with a relative position without having to use the absolute position, so it is possible to obtain the accurate position error even when using distorted position.

(2) Since it is possible to obtain the accurate position error, it is possible to accurately detect the start of reading or writing. Moreover, it is possible to use a control system, such as observer control, for the control system of the controller.

What is claimed is:

1. A head-positioning control method for a disk device for positioning a head at a specified position on a disk and comprising:

a step of demodulating a position information on said disk that is read by the head;

a step of calculating a position error between said demodulated position and a target position;

a step of correcting said position error using a set position gain according to an offset from a center of a track of the target position;

a step of calculating the amount of control for the actuator that drives said head according to said corrected position error; and a step of driving said actuator with said control amount, wherein said demodulation step comprises a step of correcting the offset signal of the position information by a sensitivity gain that is set for a track number in the position information.

2. The head-positioning control method of claim 1 further comprises;

a step of generating permission for said head to read or write, according to said corrected position error.

3. The head-positioning control method of claim 1 wherein; said correction step comprises:

a step of using said position error as the correction position error during seek control, and a step of correcting said position error by said position gain during track following control.

4. The head-positioning control method of claim 1 which further comprises:

a step of adding a sine wave to said position error to change said offset position, and measuring the values for the position gains at each offset position.

5. A head-positioning control device for a disk device for driving an actuator and positioning a head at a specified position on a disk comprising:

a demodulation circuit for demodulating the position information on said disk that is read by the head; and a control circuit for calculating the amount of control for said actuator according to a position error between said demodulated position and a target position; wherein said control circuit corrects said position error by a set position gain according to the offset from the center of the track of the target position, then calculates the amount of control for the actuator, that drives said head, according to said corrected position error, wherein said demodulation circuit corrects the offset signal of the position information by a sensitivity gain that is set for a track number in the position information.

6. The head-positioning control device of claim 5 wherein:

said control circuit generates permission for said head to read or write according to said corrected position error.

7. The head-positioning control device of claim 5 wherein:

said control circuit adds a sine wave to said position error to change said offset position, and measures the values for the position gains at each offset position.

8. The head-positioning control device of claim 5 wherein;

said control circuit calculates the amount of control according to said corrected position error by using said position error as the correction position error during seek control, and the amount of control according to said corrected position error by said position gain during track following control.

9. A disk device comprising;

a head for at least reading a disk;

an actuator for positioning said head at a specified position on said disk:

a demodulation circuit for demodulating the position information on said disk that is read by the head; and a control circuit for calculating the amount of control for said actuator according to a position error between said demodulated position and a target position; wherein said control circuit corrects said position error by a set position gain according to the offset from the center of the track of the target position, then calculates the amount of control for the actuator, that drives said head, according to said corrected position error, wherein said demodulation circuit corrects the offset signal of the position information by a sensitivity gain that is set for a track number in the position information.

10. The disk device of claim 9 wherein:

said control circuit generates permission for said head to read or write according to said corrected position error.

11. The disk device of claim 9 wherein:

said control circuit adds a sine wave to said position error to change said offset position, and measures the values for the position gains at each offset position.

12. The disk device of claim 9 wherein;

said control circuit calculates the amount of control according to said corrected position error by using said position error as the correction position error during seek control, and the amount of control according to said corrected position error by said position gain during track following control.

* * * * *